United States Patent
Sarkar

(10) Patent No.: US 8,780,790 B2
(45) Date of Patent: Jul. 15, 2014

(54) TDD OPERATION IN WIRELESS COMMUNICATION SYSTEMS

(75) Inventor: Sandip Sarkar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 962 days.

(21) Appl. No.: 12/349,251

(22) Filed: Jan. 6, 2009

(65) Prior Publication Data
US 2009/0180435 A1    Jul. 16, 2009

Related U.S. Application Data

(60) Provisional application No. 61/019,571, filed on Jan. 7, 2008.

(51) Int. Cl.
*H04W 56/00* (2009.01)
*H04L 5/14* (2006.01)
*H04W 72/04* (2009.01)

(52) U.S. Cl.
CPC ............ *H04W 56/0035* (2013.01); *H04L 5/14* (2013.01); *H04W 72/04* (2013.01)
USPC .......................................... 370/324; 370/280

(58) Field of Classification Search
None
See application file for complete search history.

(56) References Cited

U.S. PATENT DOCUMENTS

| | | | |
|---|---|---|---|
| 6,016,311 A * | 1/2000 | Gilbert et al. ................. | 370/280 |
| 6,925,068 B1 * | 8/2005 | Stanwood et al. ............ | 370/329 |
| 7,200,124 B2 * | 4/2007 | Kim et al. ..................... | 370/324 |
| 7,899,014 B2 * | 3/2011 | Li et al. ......................... | 370/332 |
| 8,014,265 B2 * | 9/2011 | Sarkar et al. .................. | 370/203 |
| 8,102,956 B2 * | 1/2012 | Dai et al. ....................... | 375/347 |
| 8,204,024 B2 * | 6/2012 | Li et al. ......................... | 370/335 |
| 8,300,574 B2 * | 10/2012 | Ding ............................. | 370/324 |
| 2002/0126618 A1 * | 9/2002 | Kim .............................. | 370/208 |
| 2003/0017830 A1 * | 1/2003 | Kayama et al. .............. | 455/450 |
| 2003/0035173 A1 * | 2/2003 | Byers et al. ................... | 359/135 |
| 2003/0117980 A1 * | 6/2003 | Kim et al. ..................... | 370/332 |
| 2004/0005887 A1 * | 1/2004 | Bahrenburg et al. ....... | 455/422.1 |
| 2005/0075125 A1 * | 4/2005 | Bada et al. .................... | 455/525 |
| 2005/0243745 A1 * | 11/2005 | Stanwood et al. ........... | 370/280 |
| 2005/0286449 A1 * | 12/2005 | Seo et al. ...................... | 370/280 |
| 2006/0176970 A1 * | 8/2006 | Dai et al. ....................... | 375/267 |
| 2007/0153734 A1 * | 7/2007 | Lee et al. ...................... | 370/329 |
| 2007/0165620 A1 * | 7/2007 | Li et al. ......................... | 370/376 |
| 2008/0089282 A1 * | 4/2008 | Malladi et al. ................ | 370/329 |

(Continued)

FOREIGN PATENT DOCUMENTS

| | | |
|---|---|---|
| CN | 1358039 A | 7/2002 |
| CN | 1512808 A | 7/2004 |

(Continued)

OTHER PUBLICATIONS

International Search Report/Written Opinion—PCT/US09/030342.

(Continued)

*Primary Examiner* — Jay P Patel
(74) *Attorney, Agent, or Firm* — Anthony R. Morris

(57) ABSTRACT

A method provides a wireless frame protocol. The method includes communicating a transmission interval that facilitates switching between a downlink portion and an uplink portion of a wireless communications channel. The method employs one or more guard periods during the transmission interval to mitigate overlap of transmitting frequencies between the downlink and uplink portions of the wireless communications channel.

33 Claims, 11 Drawing Sheets

(56) References Cited

U.S. PATENT DOCUMENTS

| | | | |
|---|---|---|---|
| 2008/0198775 A1* | 8/2008 | Nejatian | 370/280 |
| 2008/0274753 A1* | 11/2008 | Attar et al. | 455/456.6 |
| 2008/0291945 A1* | 11/2008 | Luo | 370/509 |
| 2009/0046570 A1* | 2/2009 | Sarkar et al. | 370/203 |
| 2010/0002617 A1* | 1/2010 | Seyama | 370/312 |
| 2011/0255402 A1* | 10/2011 | Fourcand | 370/230 |
| 2011/0261910 A1* | 10/2011 | Dai et al. | 375/347 |
| 2011/0293040 A1* | 12/2011 | Dupont et al. | 375/316 |

FOREIGN PATENT DOCUMENTS

| | | |
|---|---|---|
| CN | 1589541 A | 3/2005 |
| CN | 1592147 A | 3/2005 |
| CN | 1909691 A | 2/2007 |
| EP | 1213855 A1 | 6/2002 |
| EP | 1511190 A1 | 3/2005 |
| EP | 1746743 A1 | 1/2007 |
| JP | 2001358651 A | 12/2001 |
| RU | 2198476 C2 | 2/2003 |
| RU | 2255427 C2 | 6/2005 |
| WO | WO0019731 A2 | 4/2000 |
| WO | WO0130003 A1 | 4/2001 |
| WO | 03043237 A1 | 5/2003 |
| WO | 2006120990 A1 | 11/2006 |

OTHER PUBLICATIONS

International Search Authority EPO—Sep. 24, 2009.
3GPP TS 36.211 V8.1.0, 3rd Generation Partnership Project; Technical Specification Group Radio Access Network; Evolved Universal Terrestrial Radio Access (E-UTRA); Physical channels and modulation (Release 8), (Nov. 2007), pp. 1-64.
Taiwan Search Report—TW098100408—TIPO—Mar. 7, 2012.
"3rd Generation Partnership Project; Technical Specification Group Radio Access Network; Physical Channels and Modulation (Release 8)", 3GPP Standard; 3GPP TS 36.211, 3rd Generation Partnership Project (3GPP), Mobile Competence Centre ; 650, Route Deslucioles ; F-06921 Sophia-Antipolis Cedex; France, No. V1.1.0, May 1, 2007, pp. 1-34, XP050377530 chapter 5.7.1, chapter 5.8 , chapter 6.7.2.
CMCC et al., Way Forward on LTE TDD Frame Structure, 3GPP TSG RAN WG1 Meeting #51, R1-074762, Nov. 9, 2007, 3GPP TS 36.211 V1.1.0 (May 2007), pp. 1-7.

* cited by examiner

TDD OPERATION IN WIRELESS COMMUNICATION SYSTEMS

CROSS REFERENCE TO RELATED APPLICATIONS

This application claims the benefit of U.S. Provisional Patent Application No. 61/019,571, entitled FRAME STRUCTURE OPERATION IN COMMUNICATION SYSTEMS, and filed on Jan. 7, 2008, the entirety of which is incorporated herein by reference.

BACKGROUND

I. Field

The following description relates generally to wireless communications systems, and more particularly to frame structure protocols that facilitate efficient communications.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/ or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

One common application in wireless systems is uplink and downlink communications between base station and wireless devices. In these situations, it is desirable to not have overlap between signals when one component is transmitting and the other receiving. In other words, there should not be concurrent transmission by the components involved in the downlink or uplink as one component should be receiving and the other transmitting. Current protocol systems may allow for such overlap which is not desirable as communications technologies advance.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods utilize frame structure protocol enhancements for optimal use of uplink and downlink channels in wireless communications systems. In one example, such protocol enhancements can be employed with Long Term Evolution (LTE) systems that also remain compatible with existing Time Division Synchronous Code Division Multiple Access (TD-SCDMA) systems in an efficient manner. Guard periods are provided within a transmission interval of a wireless frame structure to facilitate efficient switching between downlink and uplink channels. The guard periods are employed to prevent or mitigate overlap between transmitting and receiving wireless devices (e.g., prevent two communicating components from transmitting at the same time). Such periods can be automatically configured or manually configured by the user to allow a given wireless cell to be efficiently deployed while mitigating overlapping transmission periods during switchover between downlink and uplink intervals. In one example, a guard period can be assigned for a downlink portion of the transmission interval, the uplink portion of the interval and an additional guard period can be inserted between the respective uplink and downlink portions. In addition, optimal uplink to downlink ratios can be specified and configured to increase efficiency of wireless communications.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate switchover between downlink and uplink portions of a wireless communication. In one aspect, a method provides a wireless frame protocol. The method includes communicating a transmission interval that facilitates switching between a downlink portion and an uplink portion of a wireless communications channel. The method employs one or more guard periods during the transmission interval to mitigate overlap of transmitting frequencies between the downlink and uplink portions of the wireless communications channel.

Figure 1:
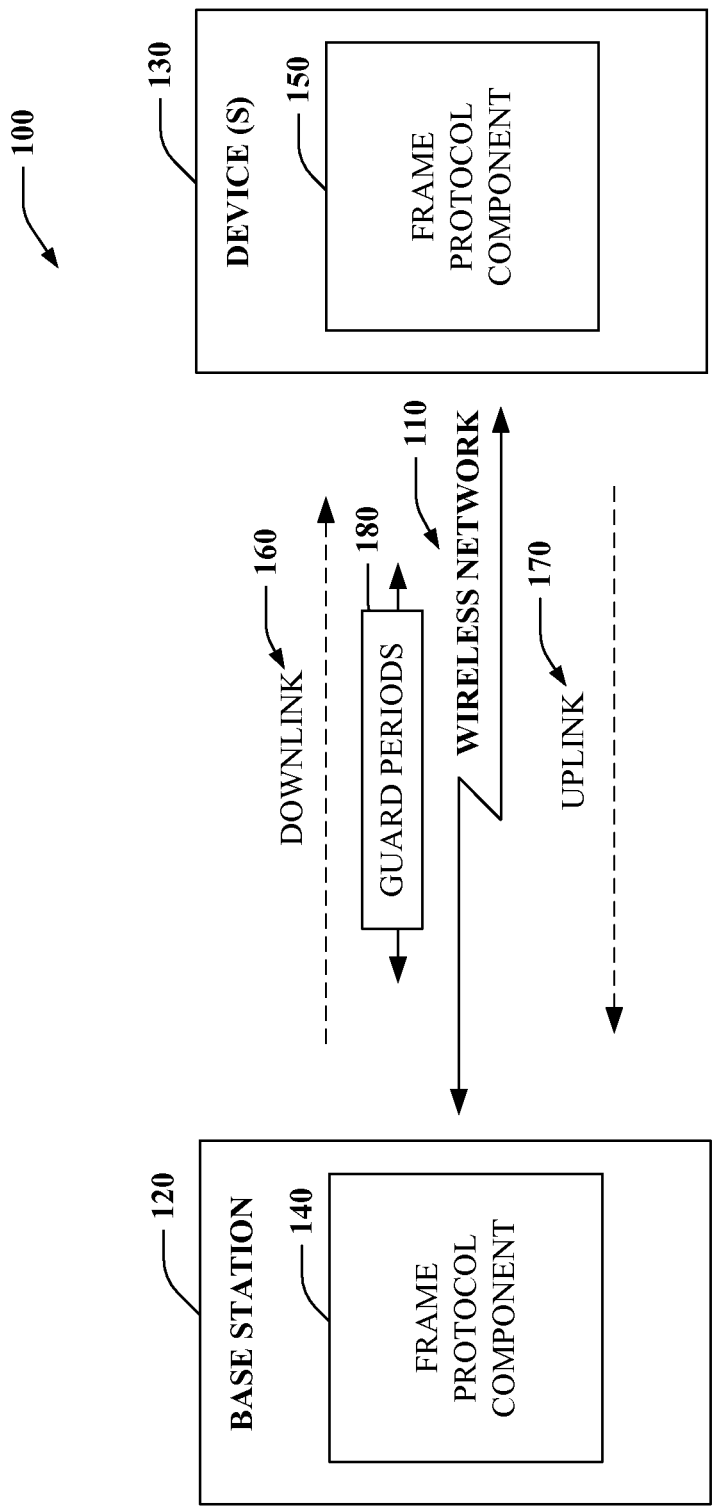
FIG. 1 is a high level block diagram of a system that employs guard periods to facilitate switchover between uplink and downlink portions of a wireless broadcast.

Referring now to FIG. 1, a system 100 employs guard periods to facilitate switchover between uplink and downlink portions of a wireless network 110. The system 100 includes a base station 120 (also referred to as evolved node B or eNB) which can be an entity capable of communication over the wireless network 110 to a second device 130 (or devices). For instance, each device 130 can be an access terminal (also referred to as terminal, user equipment, or mobile device). Each of the components 120 and 130 include a frame protocol component 140 and 150 respectively, where the protocol component is provided to improve efficiencies of communications across the network 110. As shown, the base station 120 communicates to the device 130 via downlink 160 and receives data via uplink 170. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the frame structure protocols described herein.

As shown, one or more guard periods 180 are employed for optimal use of downlink and uplink channels 160 and 170 in the wireless communications system 100. In one example, the frame protocol components 140 and 150 can be employed with Long Term Evolution (LTE) systems that also remain compatible with existing Time Division Synchronous Code Division Multiple Access (TD-SCDMA) systems in an efficient manner. The guard periods 180 are provided within a transmission interval of a wireless frame structure (described below) to facilitate efficient switching between downlink and uplink channels 160 and 170. The guard periods 180 are employed to prevent or mitigate overlap between transmitting and receiving wireless devices (e.g., prevent two communicating components 120 and 130 from transmitting at similar times). Such periods 180 can be automatically configured or manually configured by the user to allow a given wireless cell or network 110 to be efficiently deployed while mitigating overlapping transmission periods during switchover between downlink and uplink intervals. In one example, the guard period 180 can be assigned for a downlink portion of the transmission interval, the uplink portion of the interval and an additional guard period can be inserted between the respective uplink and downlink portions. In addition, optimal uplink to downlink ratios can be specified and configured to increase efficiency of wireless communications.

Generally, the frame protocol components 140. 150 support various aspects that are illustrated and described in more detail below with respect to FIGS. 2-4. This includes systems and methods to provide a wireless frame protocol 140, 150, that communicates a transmission interval that facilitates switching between the downlink portion 160 and the uplink portion 170 of a wireless communications channel. The methods employ one or more guard periods during the transmission interval to mitigate overlap of transmitting frequencies between the downlink and uplink portions of the wireless communications channel. The guard periods 180 include time reservations that are configurable include at least one downlink pilot transmission structure (DwPTS). Such guard periods 180 also include at least one uplink pilot transmission structure (UpPTS) and can be configured for a total period of about one millisecond, for example.

The guard periods 180 can be configured to repeat at about five or ten millisecond periodicity. For example, the periods 180 can be configured as two special slots that are associated with eight traffic slots during about a ten millisecond interval. This includes configuring a downlink (d) to uplink (u) ratio (d:u) that includes 4:4, 5:3, 6:2, or 3:5, for example. In another aspect, the guard periods 180 can be configured as one special slot that is associated with nine traffic slots during about a ten millisecond interval, for example. In this example, a downlink (d) to uplink (u) ratio (d:u) can include 5:4, 6:3, 7:2, or 4:5, for example.

In yet another aspect, a transmission interval (illustrated and described below) is about five milliseconds and can include at least five subframes in addition to at least eight traffic slots. For instance, such slots can include at least one of a packet data control channel (PDCCH) or a Physical Broadcast Channel (PBCH) in addition to a Primary Synchronization Signal (PSS) or a Secondary Synchronization Signal (SSS). The slots can also include one or more resource blocks for a portion of the eight traffic slots. As noted previously, such transmission intervals, special slots, traffic slots, subframes, and so forth will be illustrated and described in more detail below with respect to FIGS. 2-4.

It is noted that the system 100 can be employed with an access terminal or mobile device, and can be, for instance, a module such as an SD card, a network card, a wireless network card, a computer (including laptops, desktops, personal digital assistants PDAs), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
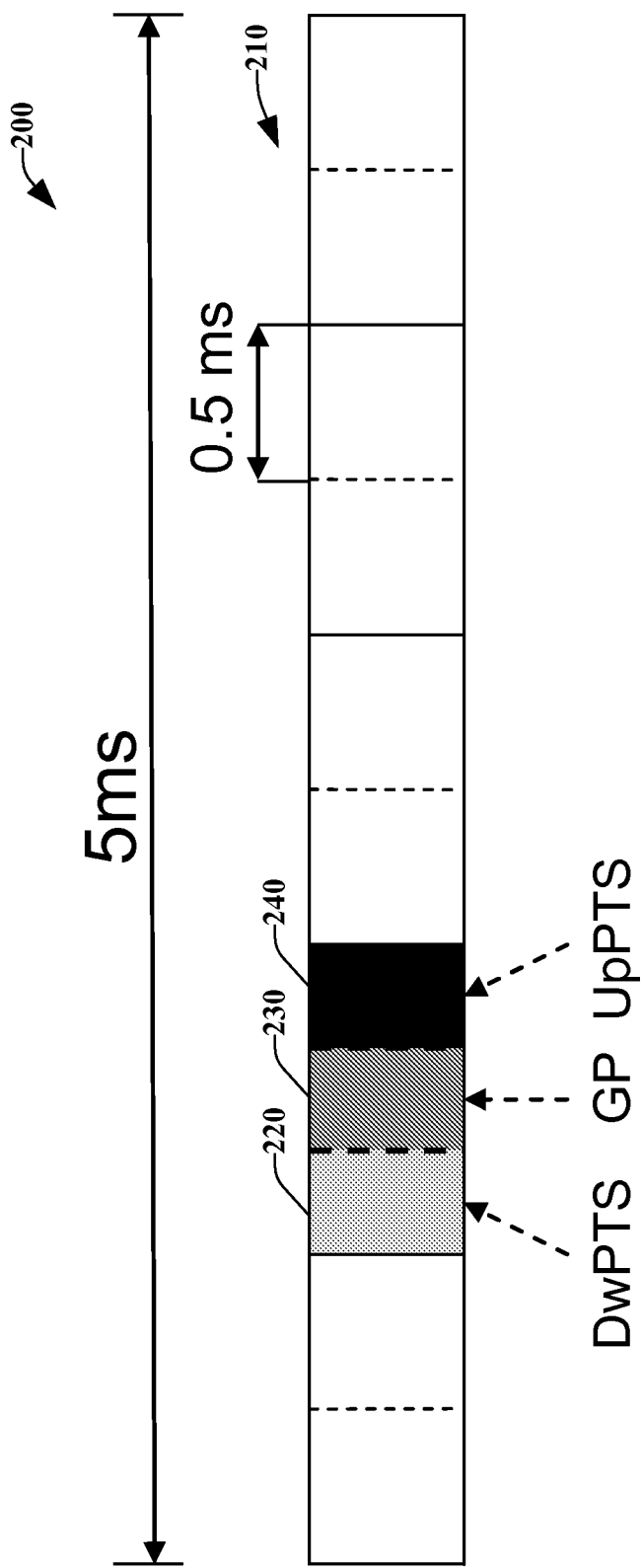
FIG. 2 illustrates high level diagram of a transmission interval that employs guard periods to mitigate frequency overlap between uplink and downlink communications.

Turning to FIG. 2, is an example diagram 200 of a transmission interval that employs guard periods to mitigate frequency overlap between uplink and downlink communications. For purposes of brevity, various acronyms are employed, where a detailed list of acronym definitions can be found near the end of the specification. In general, eight traffic slots and three special slots are configured during an example transmission interval 210. The traffic slots can include similar OFDM numerology as Frequency Division Duplex (FDD). The special slots include a downlink pilot transmission structure (DwPTS) 220, a guard period (GP) 230, and an uplink pilot transmission structure (UpPTS), where the combination of 220, 230, and 240 can be configured for about 1 millisecond (ms). Thus, individual lengths are configurable a primary synchronization (PSC) which is typically the first symbol of DwPTS 220. A secondary synchronization (SSC) is typically the last symbol of subframe 0 described below. UpPTS 240 and DwPTS 220 can be employed for efficient resource utilization, where the guard period 230 is employed to help absorb both DL→UL and UL→DL switches between communicating devices.

In general, a subframe zero (SF0) precedes the downlink portion the slot after UpPTS includes the uplink portion. Typically, there is a single DL→UL switch at a 10 ms boundary but more than one switch can be configured to occur. In one aspect, an eNB adjusts timing that is incorporated in the guard period 230. In another aspect, a data transmitter (DTX) employs 1 OFDM symbol which is approximately ≥30 ms switch time. A first special slot at 220 can include the downlink PSC (in 1.25 MHz) in a first OFDM symbol. This also allows for Resource Assignment for Utilization.

Some attributes of DwPTS include 1.4 MHz operation with a first symbol PSC. Other symbols include PDSCH>1.4 MHz, where a first symbol: 1.25 MHz PSC, Remaining bandwidth: PDSCH, D-BCH employed to resolve other timing issues. Other aspects include utilizing resource blocks (RB) in DwPTS. This includes a separate PDCCH potentially having a max span of 1 which may mitigate the need for PHICH or PCFICH. Resource blocks of SF0 can extend to DwPTS.

Regarding UpPTS, physical layer random access bursts can be provided with short bursts: e.g., Start 25 ms (768 Ts) before UpPTS. A Normal/Extended period can include: start aligned with start of the UL subframe where more preamble sequences can be employed with up to 16 allowed, for example. This burst could use remaining resources for PUSCH/PUCCH, if desired. An option includes assigning to users sending PUCCH only, thus providing better tolerance to variations of RACH. In another aspect, UpPTS could be eliminated where an RACH in a subframe is provided after UpPTS and an SRS as in FDD protocol can be employed. The UpPTS can also be employed for SRS and using subframes after UpPTS for RACH. This can include TDM, IFDM, and LFDM, for example. In another aspect, UL/DL Configurations can be limited (or expanded) for Testing, Delay, Feedback, HARQ Processes, Asymmetry Issues, UL Control, Frequency of Transition, Hopping, and UL overhead.

With respect to HARQ, a number of processes can be considered including retransmission latency, receiver buffering requirements, transmitter/receiver complexity to meet time lines. This includes providing manageable implementation complexity, processing capability, ACK multiplexing on UL including Asymmetry. Timing can include 3 ms processing times for the UE and eNB, supportable cell sizes, and DTX/DRX considerations, where synchronous operation can reduce overhead. A UL Power Control can include Interference Management, a Sounding Reference Signal with SRS support at eNB optional. The PUCCH Structure includes modulation for Orthogonal Cover for modulation, Orthogonal Cover for demodulation RS, and Mapping to Physical Resources.

Figure 3:
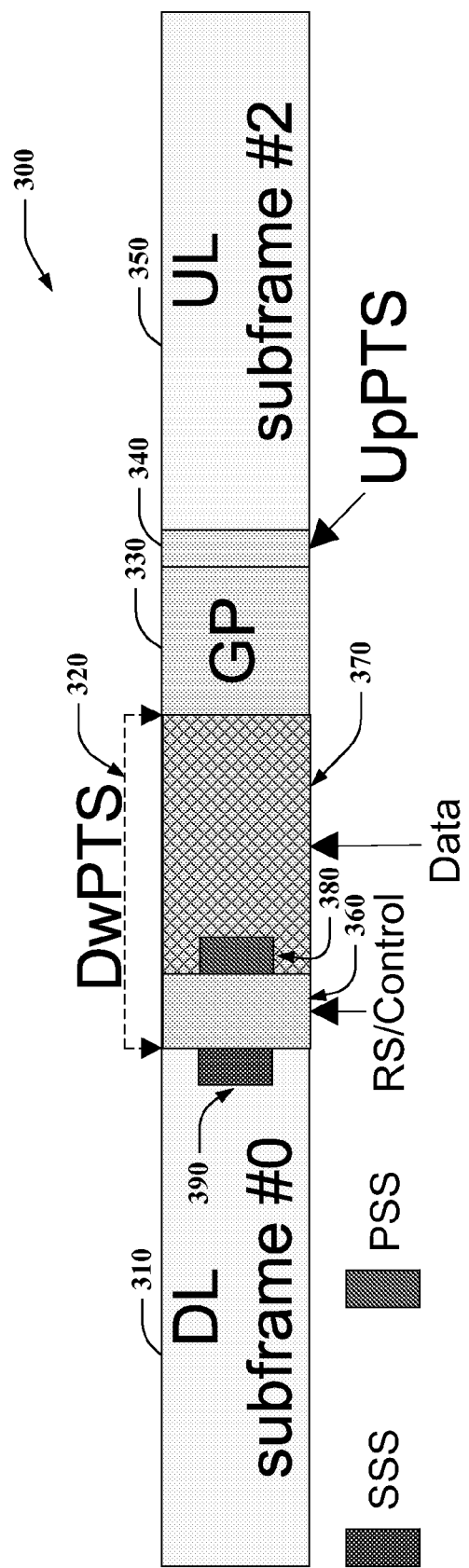
FIG. 3 illustrates a detailed diagram of an example transmission interval that employs guard periods to mitigate frequency overlap between uplink and downlink communications.

Referring to FIG. 3, an example detailed transmission interval 300 is illustrated that employs guard periods to mitigate frequency overlap between uplink and downlink communications. As shown, a subframe zero 310 precedes a DwPTS period 320, a guard period 330, a UpPTS period 340, followed by a subframe two 350. The DwPTS period includes a control portion 360, and a data portion 370 and is also followed and preceded by a primary synchronization signal (PSS) 380 and a secondary synchronization signal (SSS) 390. Some example parameters include DwPTS Length: e.g., Normal CP: 3-14 OFDM symbols, Subframe 1: Max. 12, Extended CP: 3-12 OFDM symbols, and Subframe 1: Max. 10. The PSS is transmitted on the 3rd OFDM symbol of subframes 1 and 6. The PDCCH span: e.g., 1 or 2 OFDM symbols. Data transmitted after control region can be similar to DL subframes. The Data Physical Resource Block (PRB) generally exclude the PSS. Cell specific RS patterns are similar as other DL subframes.

The guard period 330 can be configured to support Configurations to support e.g., 100 km cell radius, where Normal CP: 1-10 OFDM symbols and Extended CP: 1-8 OFDM symbols. The guard period can include 1-2 OFDM symbols, for example. The UpPTS 340 is typically 1 or 2 OFDM symbols in duration with 1 symbol for SRS only and two symbols for SRS on 1 or both symbols having a short RACH.

Figure 4:
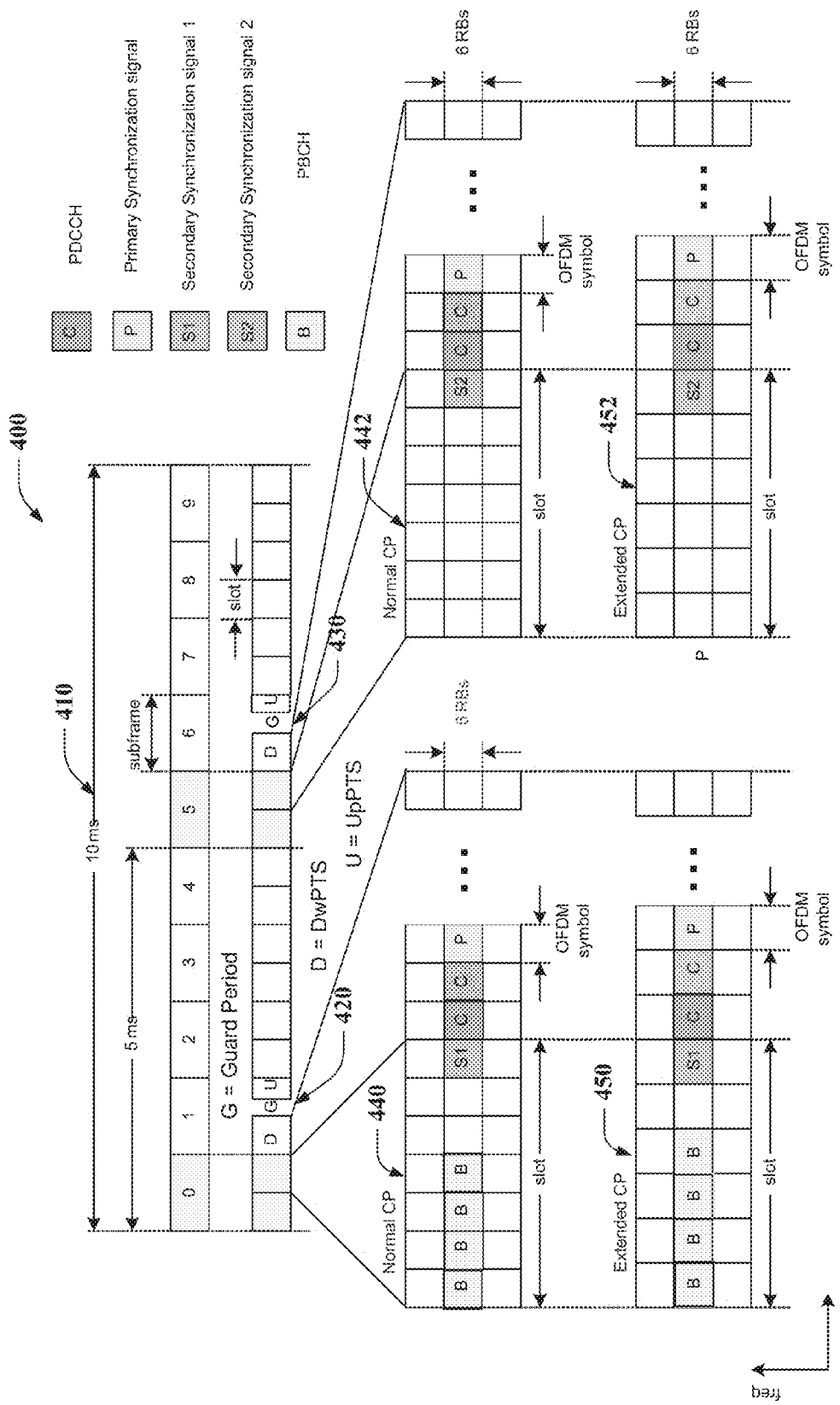
FIG. 4 illustrates a detailed diagram of an example acquisition period that employs guard periods to mitigate frequency overlap between uplink and downlink communications.

Referring to FIG. 4, an example acquisition period 400 is illustrated that employs guard periods to mitigate frequency overlap between uplink and downlink communications. As shown, a typical period 410 can be about 10 milliseconds and include 10 subframes (0 through 9). The subframes can be broken down into traffic slots and special slots that provide the guard periods described above. The guard periods are shown at 420 within subframe 1 and at 430 within subframe 6. The traffic slots can include normal cyclic prefixes at 440 and 442, and/or extended prefixes at 450 and 452. The prefixes can include for example, PDCCH (represented as C on diagram), PSS (represented as P on diagram), SS1 (represented as S1 on diagram), SS2 (represented as S2 on diagram), and PBCH (represented as B on diagram). Resource Blocks can also be provided.

Figure 5:
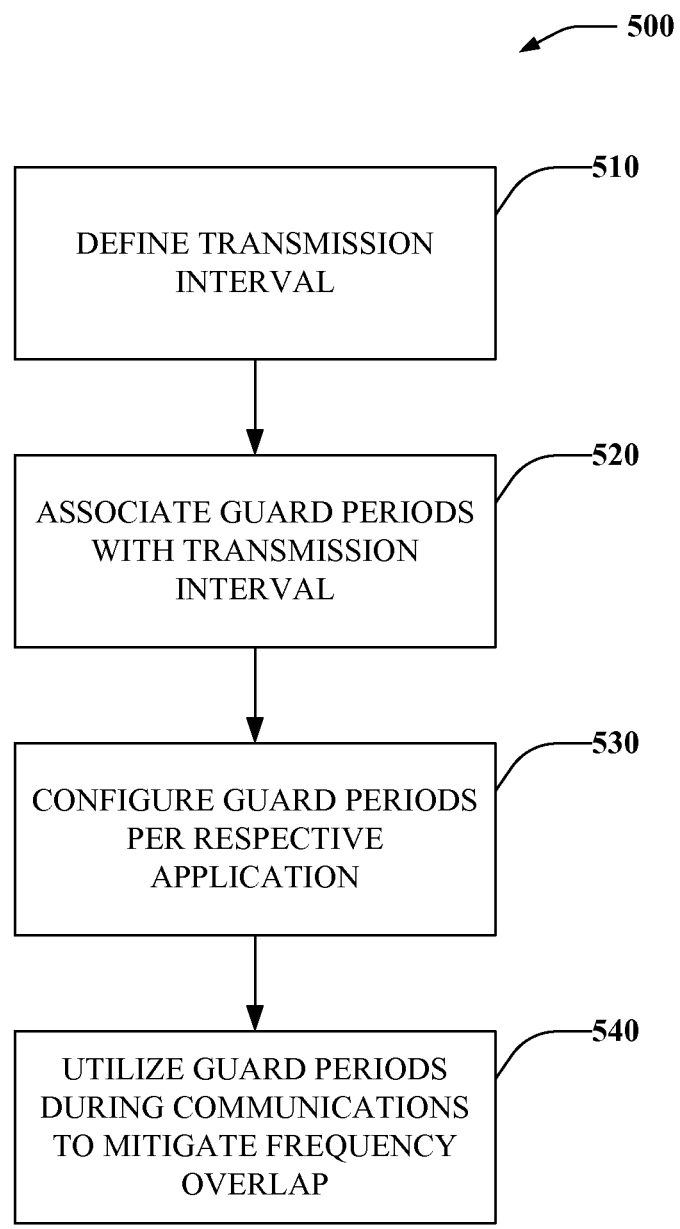
FIG. 5 illustrates a wireless communications method that utilizes a frame structure protocol to facilitate switching between uplink and downlink communications.

Referring now to FIG. 5, a wireless communications methodology 500 is illustrated. While, for purposes of simplicity of explanation, the methodology (and other methodologies described herein) are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 510, a transmission interval is defined that can be about five milliseconds as describe previously. Typically, two transmission intervals comprise an acquisition period of about ten milliseconds. At 520, guard periods are associated with the transmission intervals. As noted previously, these may include a DwPTS, a Guard Period (GP) in between, and a UpPTS. As noted above, the guard periods can be configured to repeat at about five or ten millisecond periodicity. For example, the periods (DwPTS, GP, UpPTS) can be configured as two special slots that are associated with eight traffic slots during about a ten millisecond interval. This includes configuring a downlink (d) to uplink (u) ratio (d:u) that includes 4:4, 5:3, 6:2, or 3:5, for example. In another aspect, the guard periods can be configured as one special slot that is associated with nine traffic slots during about a ten millisecond interval, for example. In this example, a downlink (d) to uplink (u) ratio (d:u) can include 5:4, 6:3, 7:2, or 4:5, for example. At 530, the guard periods are configured to adapt to a particular application at hand. For instance, if fewer devices are involved, shorter guard periods may be configured. Such periods can be manually configured at the base station or UE, and/or can be automatically configured per detected application or situation. At 540, the guard periods are utilized to mitigate frequency overlap during switchover periods between downlink and uplink channels of respective wireless communications components (e.g., base station and UE).

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
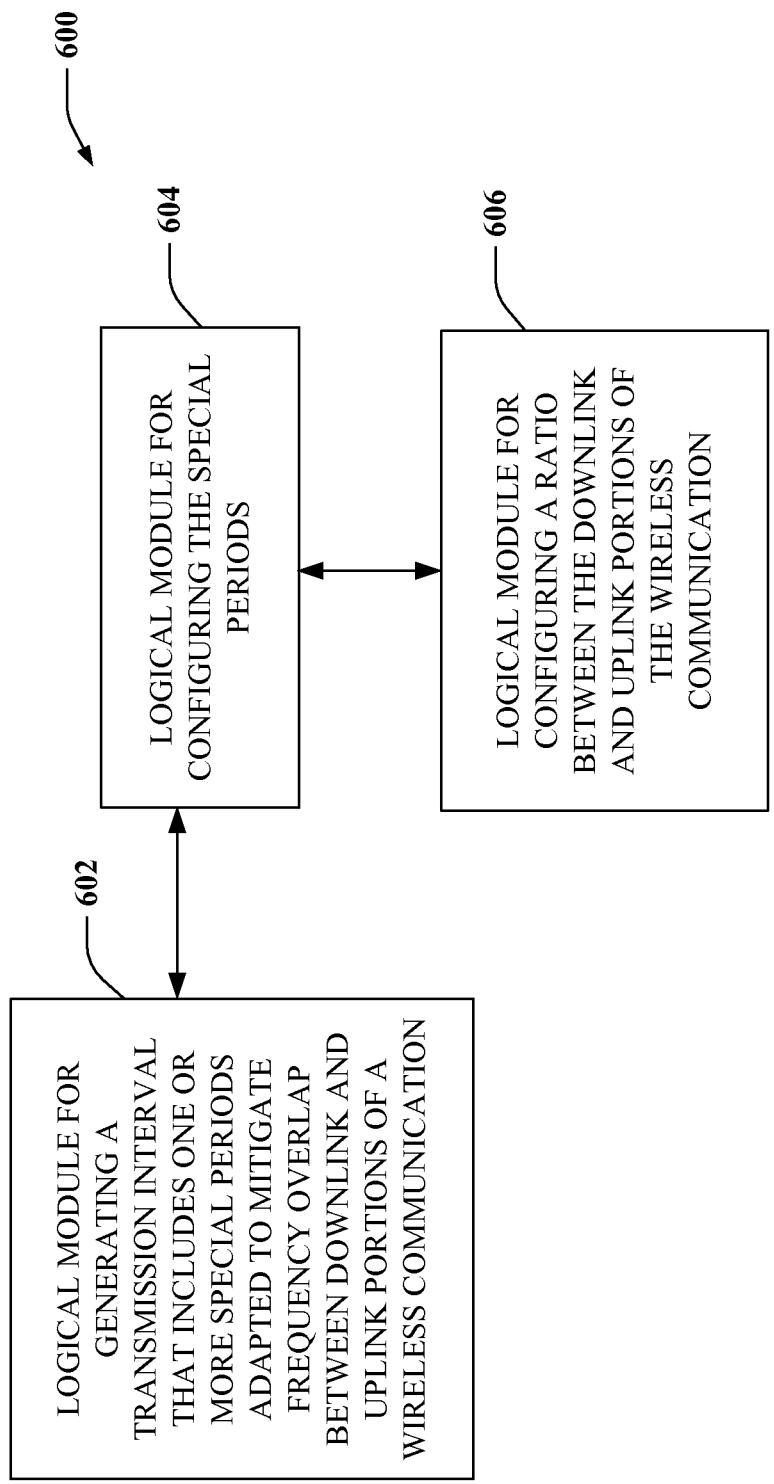
FIG. 6 illustrates an example logical module for a frame structure protocol.
Figure 7:
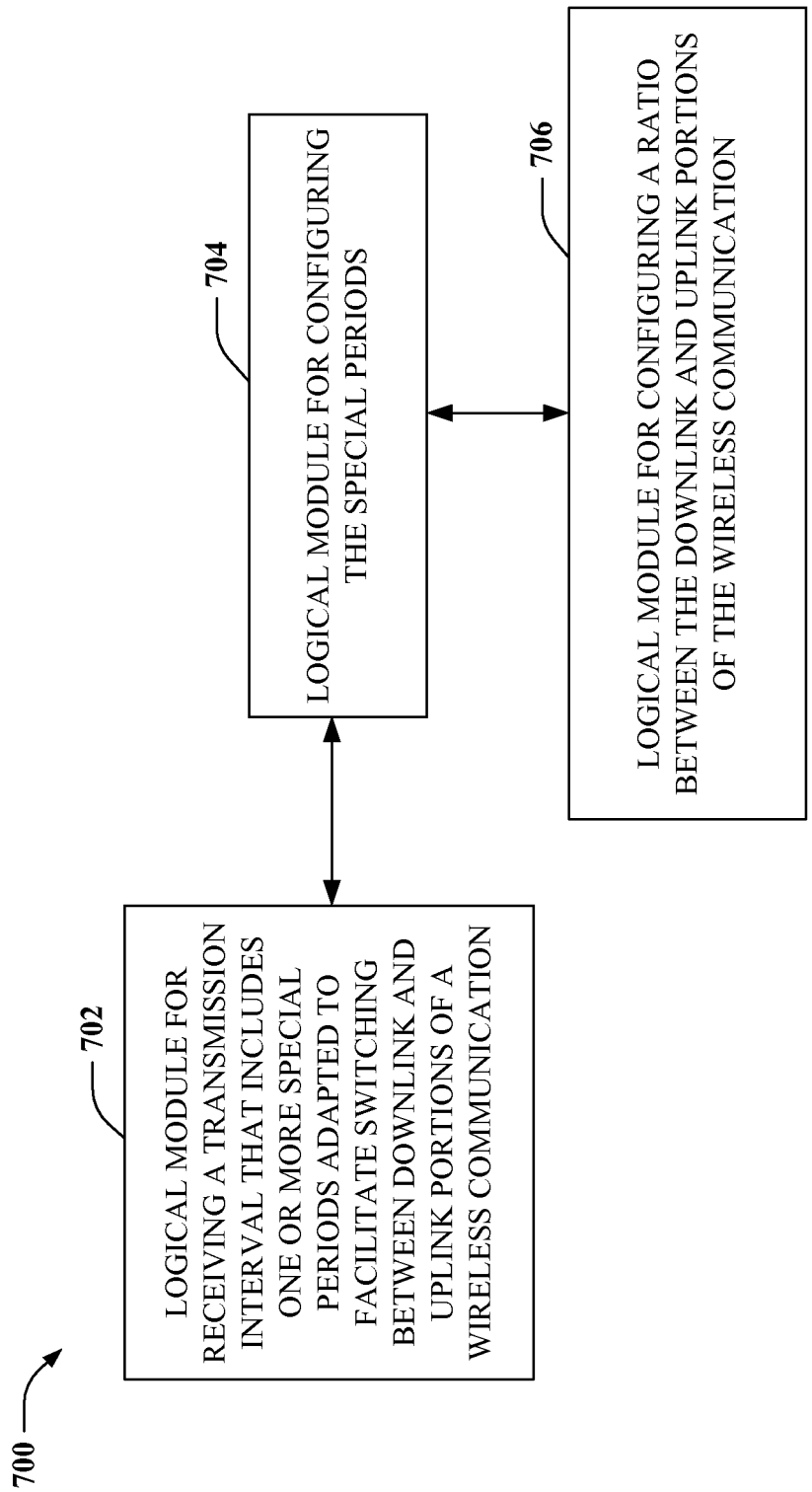
FIG. 7 illustrates an example logical module for an alternative frame structure protocol.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 for generating a transmission interval that includes one or more special periods adapted to mitigate frequency overlap between downlink and uplink portions of a wireless communication. The system 600 also includes a logical module 604 for configuring the special periods and a logical module 606 for configuring a ratio between the downlink and uplink portions of the wireless communication.

Referring to FIG. 7, a wireless communication system 700 is provided. The system 700 includes a logical module 702 for receiving a transmission interval that includes one or more special periods adapted to facilitate switching between downlink and uplink portions of a wireless communication. The system 700 also includes a logical module 704 for configuring the special periods and a logical module 706 for configuring a ratio between the downlink and uplink portions of the wireless communication.

Figure 8:
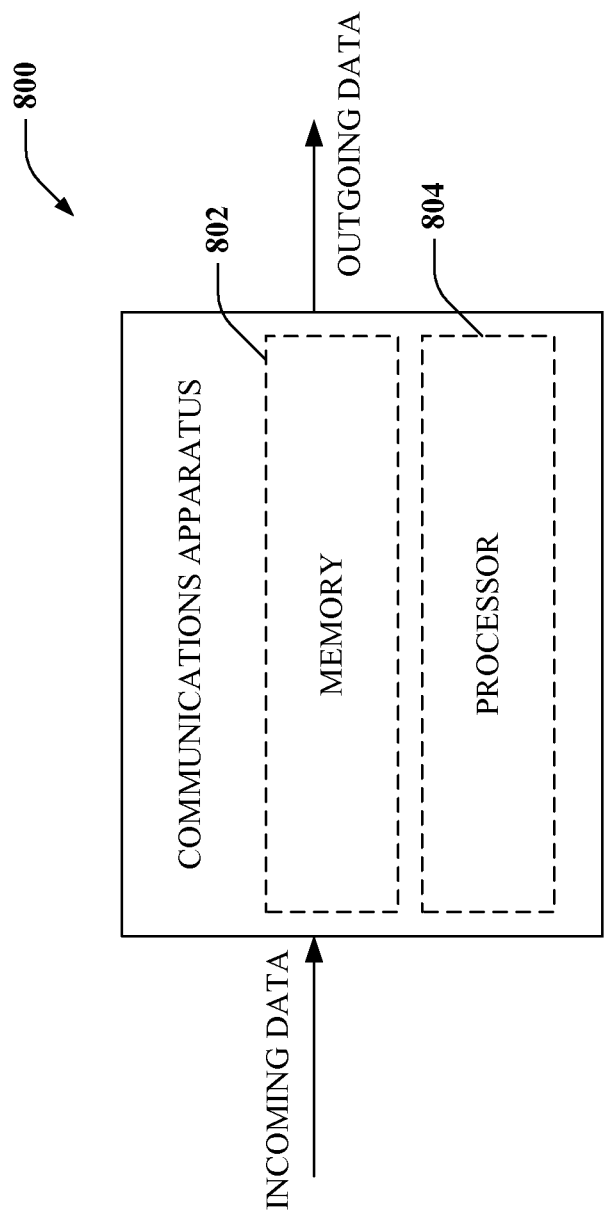
FIG. 8 illustrates an example communications apparatus that employs frame structure protocols.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
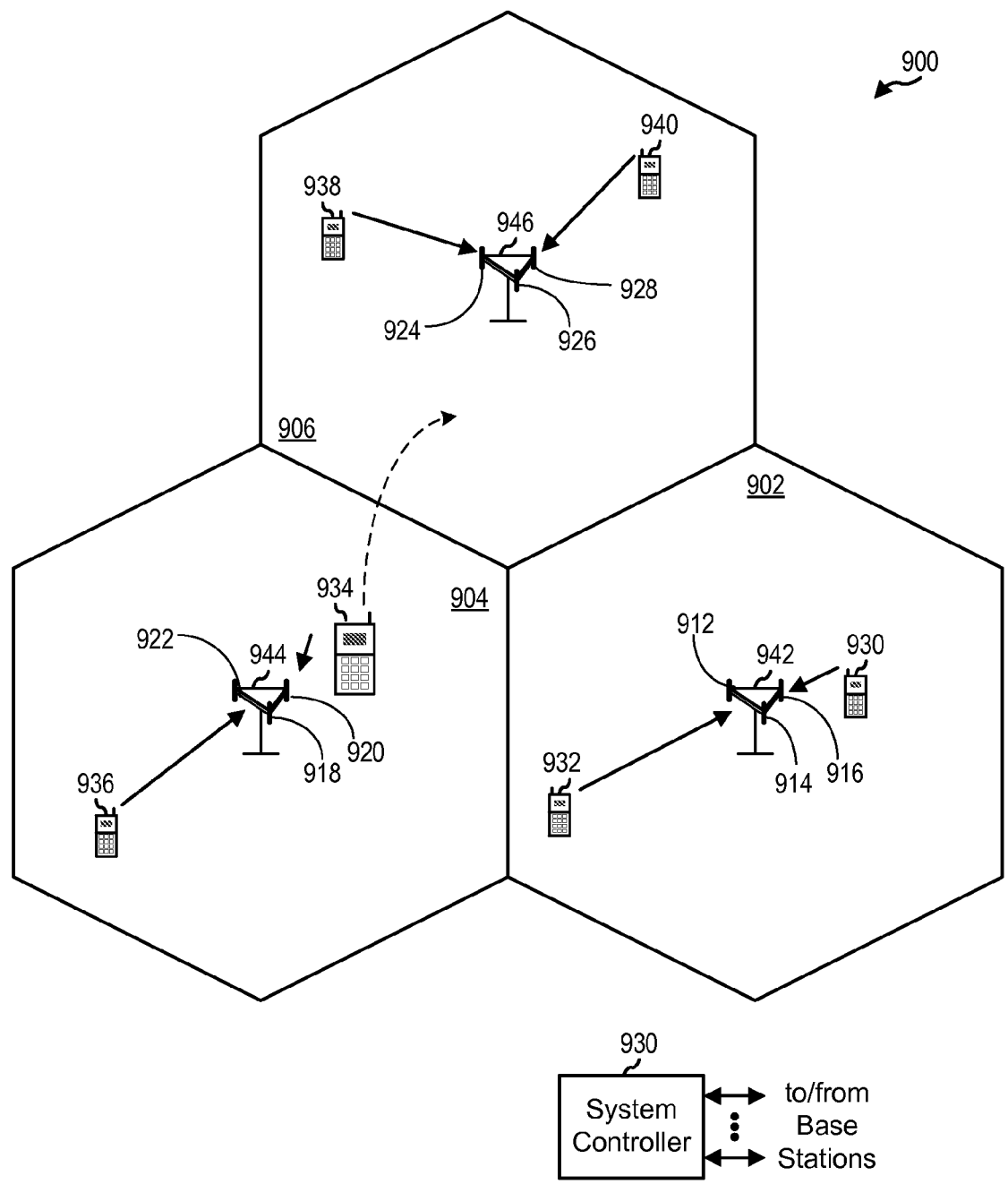
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
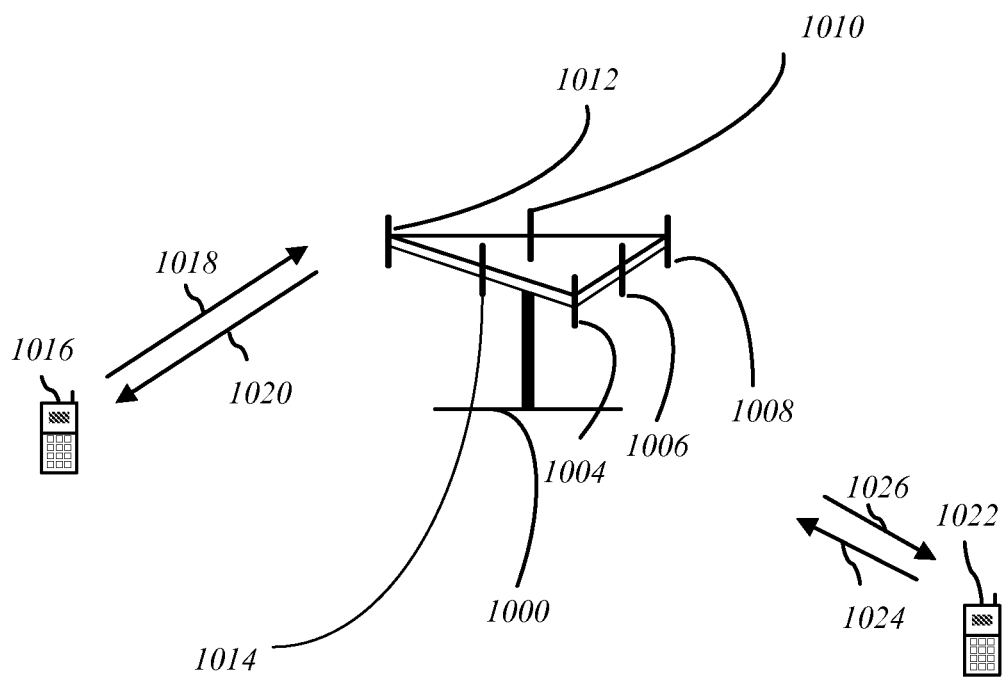
FIGS. 10 and 11 illustrate example communications systems that can be employed with frame structure protocols.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1022. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
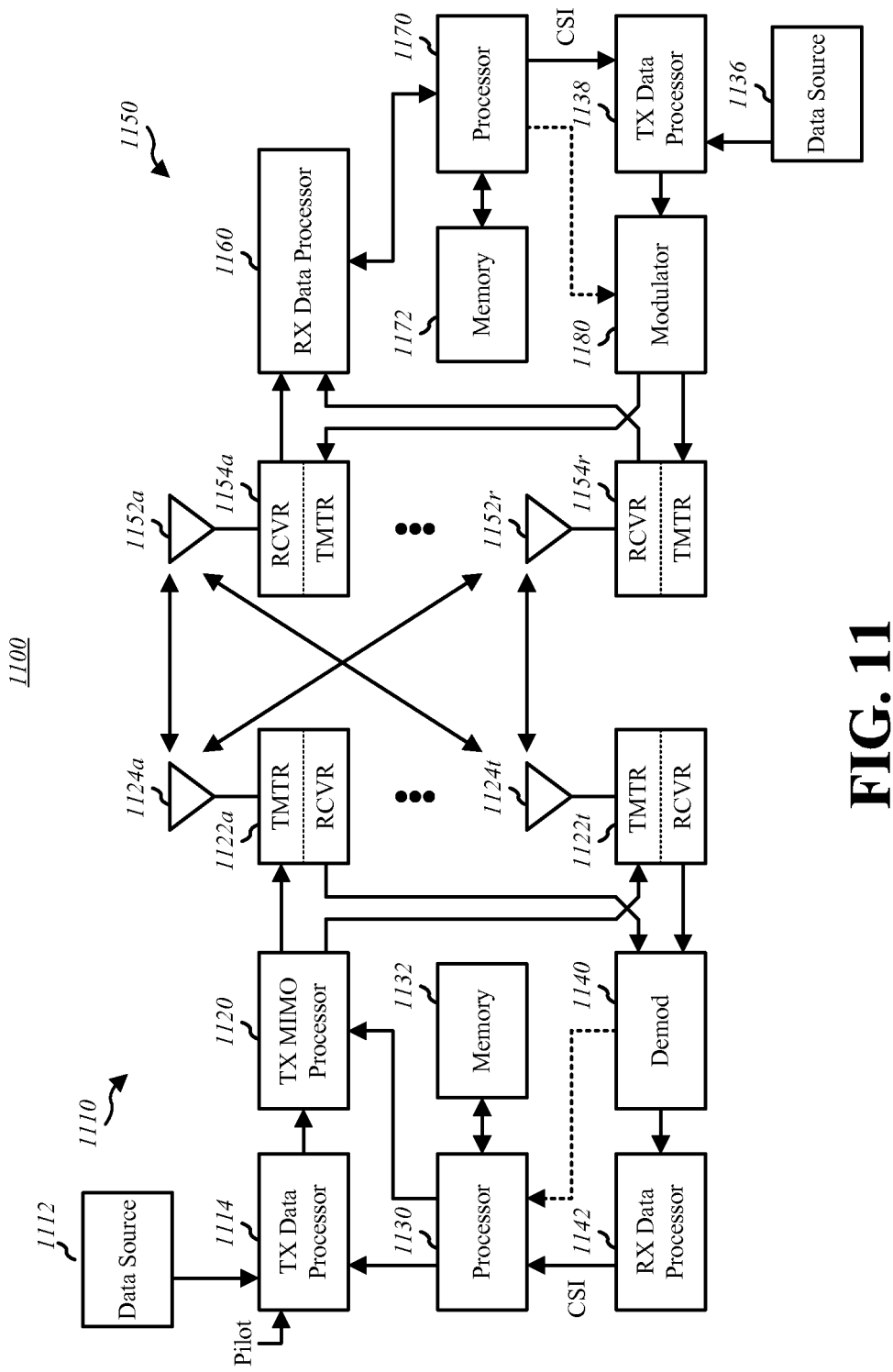

Referring to FIG. 11, a system 1100 illustrates a transmitter system 1110 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

Other terms include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to provide a wireless protocol, comprising:
   communicating a transmission interval that facilitates switching between a downlink portion and an uplink portion of a wireless communications channel; and
   employing one or more guard periods during the transmission interval to mitigate overlap of transmitting frequencies between the downlink and uplink portions of the wireless communications channel, wherein the one or more guard periods include at least one downlink pilot transmission structure (DwPTS), wherein the at least one DwPTS includes a control portion, and wherein the control portion is followed by a first synchronization signal and preceded by a second synchronization signal.

2. The method of claim 1, wherein the guard periods include time reservations that are configurable.

3. The method of claim 1, wherein the guard periods include at least one uplink pilot transmission structure (UpPTS).

4. The method of claim 1, wherein the guard periods are configured for a total period of one millisecond.

5. The method of claim 1, wherein the guard periods are configured to repeat at five or ten millisecond periodicity.

6. The method of claim 1, wherein the guard periods are configured as two special slots that are associated with eight traffic slots during a ten millisecond interval.

7. The method of claim 6, further comprising a downlink (d) to uplink (u) ratio (d:u) that includes 4:4, 5:3, 6:2, or 3:5.

8. The method of claim 6, further comprising generating at least one of a packet data control channel (PDCCH) or a Physical Broadcast Channel (PBCH) for a portion of the eight traffic slots.

9. The method of claim 6, further comprising generating one or more resource blocks for a portion of the eight traffic slots.

10. The method of claim 1, wherein the guard periods are configured as one special slot that is associated with nine traffic slots during a ten millisecond interval.

11. The method of claim 10, further comprising a downlink (d) to uplink (u) ratio (d:u) that includes 5:4, 6:3, 7:2, or 4:5.

12. The method of claim 1, wherein the transmission interval is five milliseconds.

13. The method of claim 1, wherein the transmission interval includes at least five subframes.

14. The method of claim 1, wherein the transmission interval includes at least eight traffic slots.

15. The method of claim 1, wherein the first synchronization signal is a Primary Synchronization Signal (PSS) and the second synchronization signal is a Secondary Synchronization Signal (SSS), and the method further comprises:
   generating at least one of the PSS or the SSS for a portion of the eight traffic slots.

16. A communications apparatus, comprising:
   a memory that retains instructions for reserving one or more time periods in a wireless frame protocol, the time periods employed to mitigate frequency overlap between downlink and uplink channels, the time periods include at least a downlink portion, an uplink portion, and a guard portion, wherein the downlink portion includes a control portion, wherein the one or more special periods includes a downlink pilot transmission structure (DwPTS), wherein the DwPTS includes a control portion, and wherein the control portion is followed by a first synchronization signal and preceded by a second synchronization signal; and
   a processor that executes the instructions.

17. The apparatus of claim 16, further comprising instructions for configuring the time periods.

18. The apparatus of claim 16, further comprising instructions for processing traffic slots and special slots that define the time periods.

19. The apparatus of claim 18, further comprising instructions to configure a ratio between the traffic slots and the special slots.

20. A communications apparatus, comprising:
   means for generating a transmission interval that includes one or more special periods adapted to mitigate frequency overlap between downlink and uplink portions of a wireless communication;
   means for configuring the special periods; and
   means for configuring a ratio between the downlink and uplink portions of the wireless communication, wherein the one or more special periods include a downlink pilot transmission structure (DwPTS), wherein the DwPTS includes a control portion, and wherein the control portion is followed by a first synchronization signal and preceded by a second synchronization signal.

21. A non-transitory computer-readable medium comprising a computer program product comprising:
   code for reserving a downlink buffer period of a transmission interval;
   code for assigning a guard period to the downlink period of the transmission interval; and
   code for reserving an uplink buffer period in addition to the guard period, wherein:
   the downlink buffer period, the guard period, and the uplink buffer period are employed to facilitate switching between a downlink and uplink wireless communications period,
   the downlink buffer period includes a control portion, and
   wherein the one or more special periods includes a downlink pilot transmission structure (DwPTS), wherein the DwPTS includes a control portion, and wherein
   the control portion is followed by a first synchronization signal and preceded by a second synchronization signal.

22. An apparatus comprising:
   a transmitter;
   a processor that executes the following instructions:
      configuring, by the processor at least one special period that is employed to control a time period between a downlink and an uplink portion of a wireless broadcast;
      transmitting, by the transmitter, a plurality of traffic periods in conjunction with the at least one special period; and
      utilizing, by the processor, the at least one special period and the traffic periods to control a switchover between a downlink portion and an uplink portion of a wireless broadcast, wherein:
      the at least one special period includes a downlink pilot transmission structure (DwPTS), wherein the DwPTS includes a control portion, and
      the control portion is followed by a first synchronization signal and preceded by a second synchronization signal.

23. A method to provide a wireless protocol, comprising:
   receiving a transmission interval that facilitates switching between a downlink portion and an uplink portion of a wireless communications protocol; and
   processing one or more guard periods during the transmission interval to mitigate overlap of frequencies between the downlink and uplink portions of the wireless communications protocol, wherein the one or more guard periods include a downlink pilot transmission structure (DwPTS), wherein the DwPTS includes a control portion, and wherein the control portion is followed by a first synchronization signal and preceded by a second synchronization signal.

24. The method of claim 23, wherein the guard periods include time portions that are configurable.

25. The method of claim 23, wherein the guard periods include at least one uplink pilot transmission structure (UpPTS).

26. The method of claim 23, wherein the guard periods are configured as two special slots that are associated with eight traffic slots during a 10 millisecond interval.

27. The method of claim 26, further comprising a downlink (d) to uplink (u) ratio (d:u) that includes 4:4, 5:3, 6:2, or 3:5.

28. The method of claim 23, wherein the guard periods are configured as one special slot that is associated with nine traffic slots during a ten millisecond interval.

29. The method of claim 28, further comprising a downlink (d) to uplink (u) ratio (d:u) that includes 5:4, 6:3, 7:2, or 4:5.

30. A communications apparatus, comprising:
a memory that retains instructions for receiving one or more time periods in a wireless frame protocol, the time periods employed to facilitate switching between downlink and uplink channels, the time periods include at least a downlink portion, an uplink portion, and a guard portion, wherein the downlink portion includes a control portion, wherein the one or more special periods includes a downlink pilot transmission structure (DwPTS), wherein the DwPTS includes a control portion, and wherein the control portion is followed by a first synchronization signal and preceded by a second synchronization signal; and
a processor that executes the instructions.

31. A communications apparatus, comprising:
means for receiving a transmission interval that includes one or more special periods adapted to facilitate switching between downlink and uplink portions of a wireless communication;
means for configuring the special periods; and
means for configuring a ratio between the downlink and uplink portions of the wireless communication, wherein the one or more special periods includes a downlink pilot transmission structure (DwPTS), wherein the DwPTS includes a control portion, and wherein the control portion is followed by a first synchronization signal and preceded by a second synchronization signal.

32. A non-transitory computer-readable medium comprising a computer program product comprising:
code for receiving a downlink buffer period of a transmission interval;
code for processing a guard period in accordance with the downlink period of the transmission interval; and
code for processing an uplink buffer period in addition to the guard period, wherein:
the downlink buffer period, the guard period, and the uplink buffer period are employed to facilitate switching between a downlink and uplink wireless communications period,
the downlink buffer period includes a control portion, and wherein the one or more special periods includes a downlink pilot transmission structure (DwPTS), wherein the DwPTS includes a control portion, and wherein the control portion is followed by a first synchronization signal and preceded by a second synchronization signal.

33. An apparatus comprising:
a receiver;
a processor that executes the following instructions:
configuring, by the processor, at least one special period that is employed to control a time period between a downlink and an uplink portion of a wireless broadcast;
receiving, by the receiver a plurality of traffic periods in conjunction with the at least one special period; and
processing, by the processor, the at least one special period and the traffic periods to control a switchover between a downlink portion and an uplink portion of a wireless broadcast, wherein the at least one special period includes a downlink pilot transmission structure (DwPTS), wherein the DwPTS includes a control portion, and wherein the control portion is followed by a first synchronization signal and preceded by a second synchronization signal.

* * * * *